Feb. 3, 1970          L. ROVNER          3,493,304
ELECTRONIC MICROPARTICLE COUNTER
Filed Feb. 3, 1965                           2 Sheets-Sheet 1
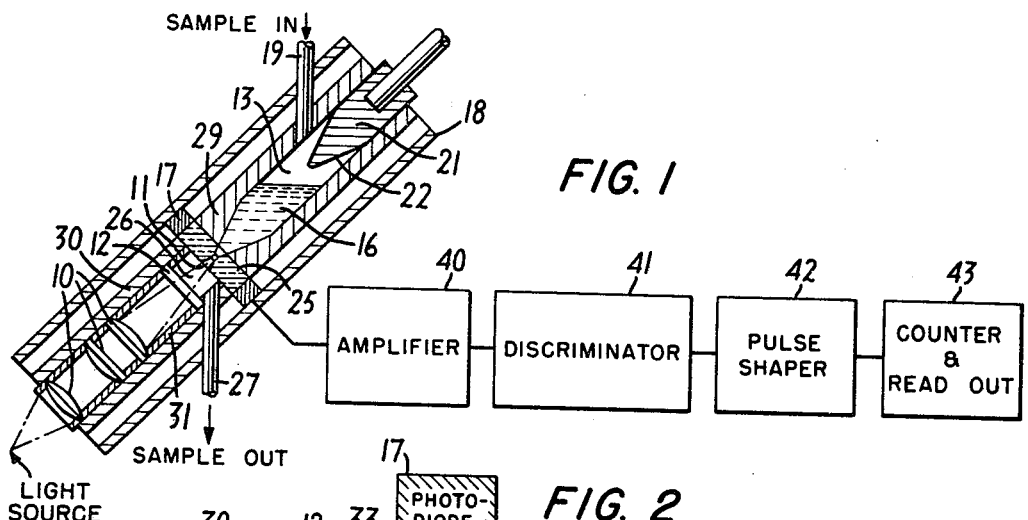
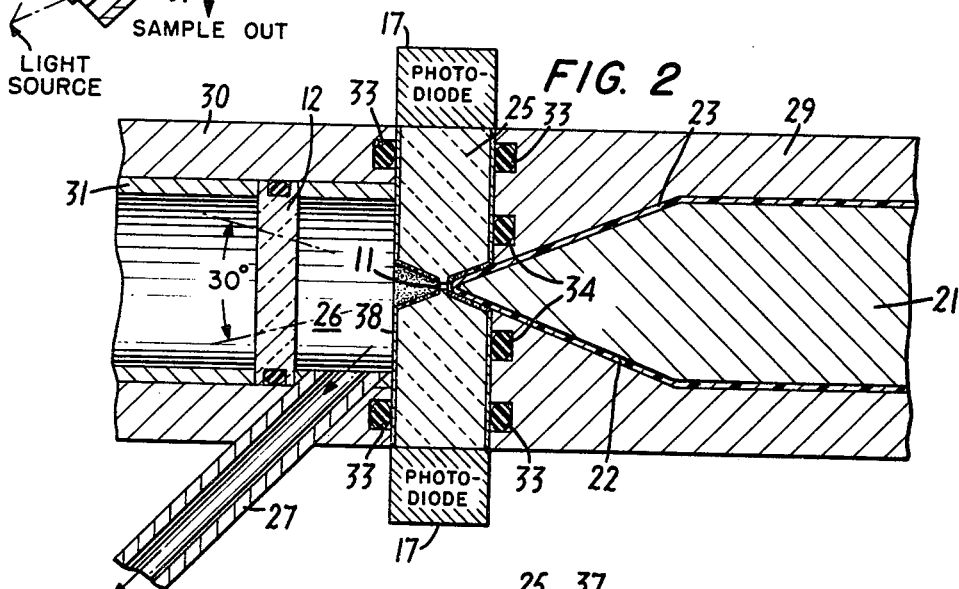
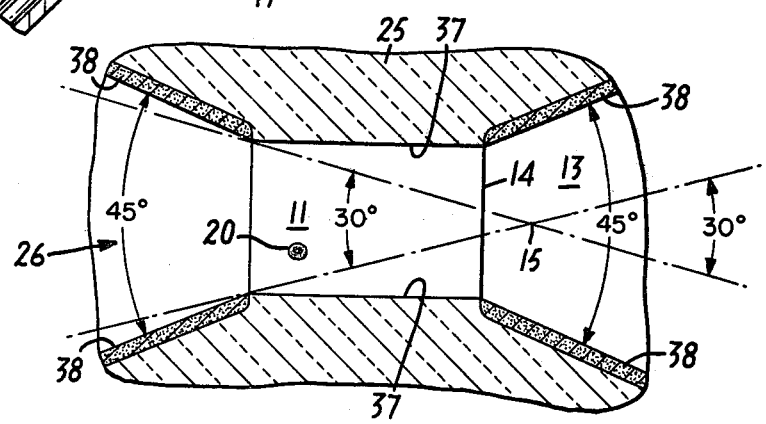
INVENTOR.
LEOPOLD ROVNER
BY
Brumbaugh, Free, Graves & Donohue
his ATTORNEYS

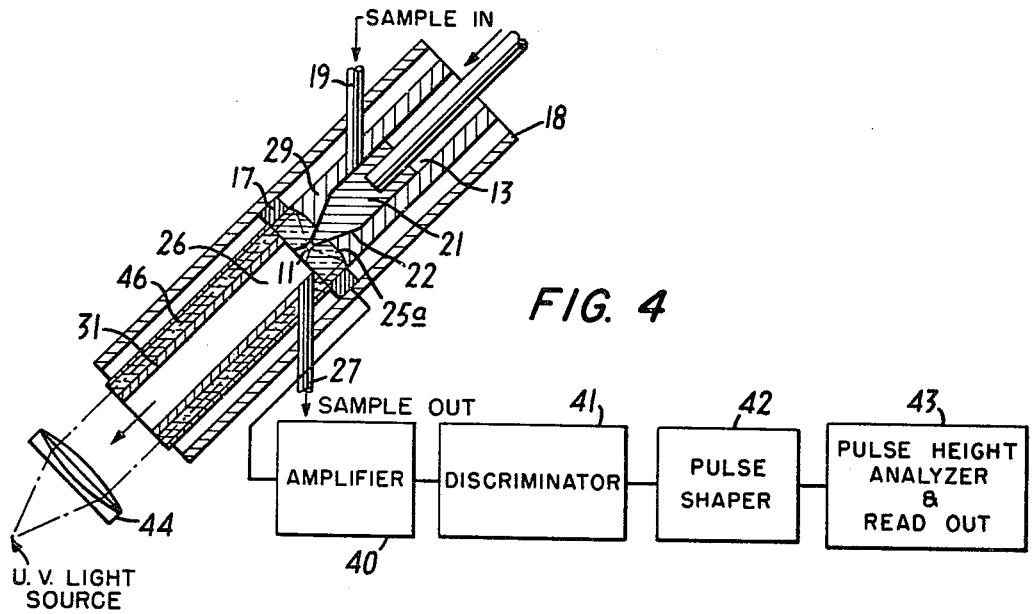
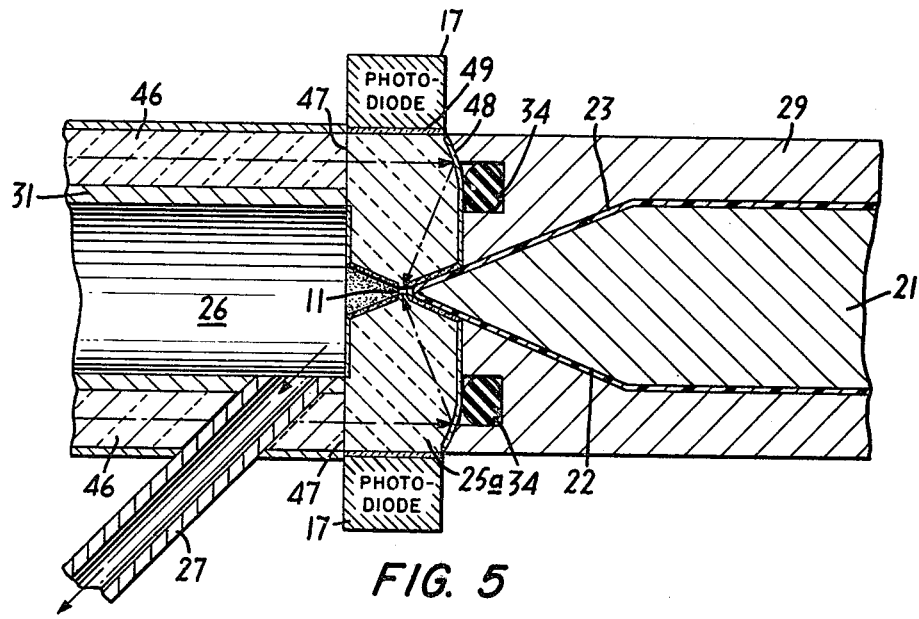

United States Patent Office 3,493,304
Patented Feb. 3, 1970

3,493,304
ELECTRONIC MICROPARTICLE COUNTER
Leopold Rovner, 2300 Overlook Road,
Cambridge, Mass. 44106
Filed Feb. 3, 1965, Ser. No. 430,107
Int. Cl. G01n 21/00
U.S. Cl. 356—103                                    3 Claims

ABSTRACT OF THE DISCLOSURE

In the particular embodiments of the invention described herein, a microparticle detector utilizes a light-transmitting member having a small orifice through which a liquid sample containing mircroparticles is passed. In one embodiment, the orifice is illuminated from one side of the member and light reflected by each microparticle within the orifice is transmitted through the member to a photocell which actuates a counting circuit. Another embodiment transmits ultraviolet light through the member to illuminate the orifice and receives fluorescent emission from a microparticle in the orifice and conducts it back to a photocell.

---

The present invention relates to systems for detecting the presence of microparticles, such as blood cells, in a fluid suspension. More particularly, the invention relates to a novel and improved arrangement for scanning and counting these particles without visual observation.

In a typical arrangement used for counting microparticles, a considerable number of precision ground optical lenses are arranged in a microscope system. As known, such lens systems are used in arrangements for automatically counting the number of microparticles in fluid suspensions. Not only are lens systems of this type expensive but, furthermore, the sensitivity of the detecting system is limited by the maximum aperture which is possible for conventional lens systems of about F/0.5.

Accordingly, it is an object of this invention to provide a new and improved system for detecting micropar- ticles in fluid suspension which eliminates the disadvantages of the prior art.

Another object of the invention is to provide a novel and improved microparticle counting device.

A further object of the invention is to provide a device for scanning a sample of fluid material to detect the existence of microparticles therein.

These and other objects of the invention are attained by providing a member having a light transmitting orifice through which a fluid may be directed, along with an arrangement for illuminating the orifice, and a photosensitive device which is not normally responsive to the illuumination and an arrangement for conducting light from a microparticle in the orifice to the photosensitive device. In a preferred embodiment, the light transmitting orifice is formed in a member made, for example, of sapphire and the photosensitive element is positioned to receive light transmitted through the sapphire. A source of light is arranged to illuminate the orifice and, when it illuminates a microparticle, light is transmitted to provide a pulse output from the photosensitive device. When the system is used as a counter, the photosensitive device provides a signal to an electronic counter so that, after a selected volume of sample fluid has passed completely through the orifice, the electronic counter will indicate the number of particles held in suspension in the fluid sample. In certain instances, the light transmitted to the photosensitive device may have a different wave length than the illumination so that only fluorescent particles are detected.

Further objects and advantages of the invention will be apparent from a reading of the following description in conjunction with the accompanying drawings, in which:

FIG. 1 is a longitudinal sectional view, partly schematic, of an exemplary emobdiment in accordance with the invention, illustrating a system for detecting microparticles in a fluid suspension;

FIG. 2 is an enlarged fragmentary view showing some of the elements of FIG. 1 in greater detail;

FIG. 3 is a further enlarged fragmentary view showing the details of the light transmitting orifice;

FIG. 4 is a longitudinal sectional view, partly schematic, illustrating another exemplary embodiment of the invention;

FIG. 5 is an enlarged section view showing a portion of the embodiment of FIG. 4;

In the typical embodiment shown in FIGS. 1–3, the microparticle detector comprises a source of light focused by means of a series of condensing lenses 10 so as to converge upon a light transmitting orifice 11 provided in the center of a circular light transmitting member 25. Preferably, the member 25 is a disc of material, such as sapphire, which is highly resistant to erosion, while, at the same time, being sufficiently transparent to transmit light from the orifice 11 to the peripheral surface of the member. As shown in FIG. 3, the light converges in a 30° angle upon the orifice 11. Interposed in the path of the light is a transparent window 12, which prevents the sample fluid from reaching the condensing lenses. As seen in FIG. 3, the light converges to a point 15 within an intake chamber 13, a short distance beyond the inlet end 14 of the orifice 11.

It will be understood that a fluid having no suspended microparticles scatters little or no light at right angles to the axis of the converging light beam when passing through the orifice 11. A photosensitive device, which may be a circular photodiode element 17, is disposed around the member 25 at right angles to the optical axis of the light source. Inasmuch as no light is normally scattered into the member 25, the photodiode 17 will not be actuated until a microparticle 20 of the sample fluid enters the light transmitting orifice 11. Whenever a microparticle 20 does enter the orifice, the light from the source will be scattered from the particle and cause actuation of the photosensitive device 17.

A cylindrical tubular housing 18, shown in FIG 1, has an intake port 19 which allows a sample of fluid to be placed in the fluid chamber 13. A piston member 21, with a conical front portion 22, is adapted to be reciprocated along the axis of the tube within the chamber 13. When the piston 21 is in the position shown in FIG. 2, a predetermined selected quantity of sample fluid to be analyzed has been trapped and placed under pressure and thereby directed through the light transmitting orifice 11. It will be noted in this view that the piston 21 is shown covered with some protective material 23. This covering could, for example, be made of Teflon. Of course,it should be quite clear that the means for passing a specific quantity of fluid suspension through the orifice 11 has only been shown in schematic form and those skilled in the art will readily appreciate the details necessary to construct a device which will perform this function. After the fluid has passed through the light transmitting orifice 11, it then flows to an outlet chamber 26. This outlet chamber 26 is in direct communication with an outlet port 27, wherein the sample passes out of the housing 18.

As shown in FIG. 1, the housing 18 receives the photodiode 17 within its inner surface. The photodiode 17 has a ring-shaped configuration and is secured to the outer surface of the sapphire disc 25 by a high strength transparent adhesive, such as optical cement, so that light can pass easily from the disc to the photodiode. In addition, the inlet chamber 13 is partially formed by a hollow member 29 and partially by a conical surface in the sapphire disc 25. The end of the chamber 13 is, of course, the inlet 14 to the orifice 11. A tubular member 30 is provided with an inner sleeve member 31, which retains the window 12 in spaced relation to the disc 25 so as to define the outlet chamber 26. Several O-rings 33 and 34, provided along the sides of the sapphire disc 25 where the sides engage the members 29 and 30, prevent leakage of the sample fluid suspension along the adjacent surfaces.

It will be noted that, except for the disc surface 37 forming the light transmitting orifice 11 and for the peripheral surface directly engaging the photodiode, all of the remaining surfaces 38 of the sapphire member 25 are either mirrored or opaque. (See FIG. 3.) This arrangement is simply to prevent any extraneous light from actuating the photodiode 17 and also to retain and direct toward the photodiode light transmitted into the sapphire disc at the orifice. Thus, as detailed in FIG. 3, only the light in the 30° converging cone, which impinges upon a microparticle 20 in the light transmitting orifice 11, may be scatetered outwardly through the clear sapphire surface 37 to actuate the photodiode 17. As illustrated, the inlet and outlet fluid chambers 13 and 26 converge upon the light transmitting orifice at a 45° angle.

It will be appreciated that the dimensions of the cylindrical orifice 11 should be reasonably uniform. For a specific example, the orifice 11 may be 100 microns in diameter and 150 microns in length. The fluid with the microparticles in suspension should be very dilute so that the probability that more than one microparticle will pass through the orifice, at any given time, is very small. This, of course, is to obviate the possibility that two or more microparticles will be counted as just one. The medium used to disperse the microparticle suspension will depend upon the material being studied, and the selection of the medium will be appropriate to individual cases.

The electrical circuitry employed with the embodiment of FIGS. 1–3 is shown in schematic form in FIG. 1. Each time a microparticle 20 passes through the orifice 11 and is illuminated therein, the photodiode 17 will be actuated. The diode 17 provides an input signal to an amplifier 40. The amplifier 40 is coupled to a discriminator circuit 41, which is adapted to quench or clip any undesirable low-level noise and allows only the high-level amplified signal from the photodiode 17, indicating the recognition of a particle, to pass through onto a pulse-shaper 42. The output pulse from the pulse-shaper 42 then actuates an electronic counter 43.

It now should be clear that after the complete sample under consideration has passed through the orifice 11, the counter 43 will record a reading which indicates the number of particles held in suspension in the sample.

In FIGS. 4 and 5, another exemplary embodiment is provided which utilizes a source of ultraviolet light to induce bright fluorescence in certain types or areas of microparticles when they are in the orifice 11. Where parts correspond with the first embodiment, the same numbers will be used. The ultraviolet light is formed in parallel rays by an ultraviolet transmitting lens 44 and passes up along the tube 18 by means of a quartz tube 46. The clear quartz of the tube 46 is chosen because it allows the parallel light beams of ultraviolet light to pass on through it and through the clear junction 47 with the sapphire member 25a. the member 25a is similar to the sapphire disc 25 of FIGS. 1–3 but is formed with a convex surface 48 on one side, which is mirrored so that the parallel light beams passing through from the clear quartz tube 46 will be directed inward through the orifice 11 into the sample material passing therethrough. Between the peripheral surface of the disc 25a and the photodiode 17 there is disposed a filter 49 which prevents ultraviolet light from passing to the photodiode but permits light of longer wave lengths resulting from fluorescence of a particle to pass.

If the same place has fluorescent microparticle content, this fluorescent light is largely trapped in the disc 25a and is sent back through it to the photodiode 17. Proper dyes may be used to cause fluorescence of all areas or specific parts of the microparticles.

In fluorescence work with this system, the photodiode 17 or other photosensitive device employed in FIG. 4 must be selected to be responsive to excitations of a longer wave length than that of the light from the source. This longer wave length is caused by the fluorescent light emission of discrete single cells or parts of such cells in the fluid suspension. Because the fluorescent light is trapped in the disc 25a, the diode 17 generates pulses whose amplitude is faithfully related to the light-emission amplitude from discrete single cells, or from parts of them. In fluorescence scanning systems, the unit will therefore classify the amplitudes of the fluorescence pulses by means of the pulse height analyzer 43.

From the preceding description of embodiments of the invention, it will be clear that the invention comprehends the provision of a light transmitting orifice and a source of light directed to the orifice. When a microparticles of a fluid suspension enters the orifice, a light conducting member conduits either scattered light from the microparticle or the fluorescent emission from the microparticle to a photosensitive device. This photosensitive device then, in turn, actuates an electronic counter. In counting systems, after a predetermined quantity of fluid suspension has passed through the orifice, the counter will register the number of microparticles in that suspension.

It will be understood by those skilled in the art that the above-described embodiments are meant to be merely exemplary and that they are susceptible to modification and variation without departing from the spirit and scope of the invention. Therefore, all such variations and modifications are included within the scope of the invention as set forth in the appended claims.

I claim:

1. Apparatus for detecting the presence of individual microparticles in a fluid suspension one at a time comprising a light conducting member of generally circular cylindrical configuration with a small central orifice having a diameter of the same general order of magnitude as the size of the microparticles to be detected, the light conducting member including inlet and outlet passages having a generally converging shape leading to the central orifice and having a length greater than that of the central orifice, said inlet passage, orifice, and outlet passage being generally codirectional with the axis of said circular cylindrical light conducting member, means for directing a fluid suspension through the inlet passage, the orifice, and the outlet passage, illuminating means for directing light toward the orifice so as to illuminate a microparticle disposed in a suspending fluid within the orifice, and photosensitive detecting means arranged to receive light from a microparticle disposed within the orifice to produce a response, said illuminating means and said photosensitive detecting means being positioned relative to the light conducting member so that when no particle is in the orifice no actuating light will reach the photosensitive detecting means, but when a particle is present in the orifice actuating light will reach the photosensitive detecting means, at least one of the illuminating means and the detecting means being in optical communication with the generally circular light conducting member so as to substantially surround a microparticle disposed within the orifice whereby a relatively large response is produced in the photosensitive detecting means to each individual microparticle as it passes separately through the orifice.

2. Apparatus as claimed in claim 1, including a lens system for converging light to the orifice, and wherein the light conducting member conducts light scattered from a microparticle in the orifice to the photosensitive device.

3. Apparauts as claimed in claim 1, for determining the presence of particles containing fluorescent material, wherein the illuminating means emits ultraviolet light and wherein the photosensitive device is responsive to light of longer wave length.

References Cited

UNITED STATES PATENTS

| | | | |
|---|---|---|---|
| 3,084,591 | 4/1963 | Stevens | 356—102 X |
| 3,127,505 | 3/1964 | Gustavson. | |
| 3,275,744 | 9/1966 | Dietrich. | |
| 2,709,367 | 5/1955 | Bohnet. | |
| 2,759,602 | 8/1956 | Baigent | 250—227 X |
| 2,866,378 | 12/1958 | Warshaw et al. | |
| 3,051,038 | 8/1962 | Duke | 350—96 X |
| 3,105,908 | 10/1963 | Burkhardt et al. | |
| 3,264,474 | 8/1966 | Heiss | 250—71 |
| 3,296,446 | 1/1967 | Heller. | |
| 3,306,157 | 2/1967 | Hach. | |

JEWELL H. PEDERSEN, Primary Examiner

W. A. SKLAR, Assistant Examiner

U.S. Cl. X.R.

250—71, 227; 350—96

PO-1050
(5/69)

UNITED STATES PATENT OFFICE
CERTIFICATE OF CORRECTION

Patent No. 3,493,304                 Dated February 3, 1970

Inventor(s) Leopold Rovner

It is certified that error appears in the above-identified patent and that said Letters Patent are hereby corrected as shown below:

Column 1, line 4, "Cambridge, Mass. should be -- Cleveland Heights, Ohio -- line 53, "illuumination" should be --illumination --

Column 2, line 1, "counjunction" should be -- conjunction -- line 4, "emobdiment" should be -- embodiment -- line 14, "section" should be -- sectional --

Column 3, line 22, "scatetered" should be -- scattered -- line 65, "the" first occurrence should be -- The -- line 75, "same place" should be -- sample --

Column 4, line 21, "microparticles" should be --microparticle-- line 23, "conduits" should be -- conducts -- line 73, "Apparauts" should be -- Apparatus --

SIGNED AND
SEALED

JUN 30 1970

(SEAL)
Attest:

Edward M. Fletcher, Jr.
Attesting Officer

WILLIAM E. SCHUYLER, JR.
Commissioner of Patents